United States Patent
Thangaraj et al.

(10) Patent No.: US 9,916,087 B2
(45) Date of Patent: Mar. 13, 2018

(54) METHOD AND SYSTEM FOR THROTTLING BANDWIDTH BASED ON TEMPERATURE

(71) Applicant: SanDisk Technologies LLC, Plano, TX (US)

(72) Inventors: Senthil M. Thangaraj, Fremont, CA (US); Divya Reddy, Milpitas, CA (US); Satish Babu Vasudeva, Fremont, CA (US); Jimmy Sy, Daly City, CA (US); Rodney Brittner, San Jose, CA (US); Venkatesh K. Paulsamy, Mountain View, CA (US)

(73) Assignee: SanDisk Technologies LLC, Plano, TX (US)

( * ) Notice: Subject to any disclaimer, the term of this patent is extended or adjusted under 35 U.S.C. 154(b) by 0 days.

(21) Appl. No.: 14/668,710

(22) Filed: Mar. 25, 2015

(65) Prior Publication Data

US 2016/0117105 A1 Apr. 28, 2016

Related U.S. Application Data

(60) Provisional application No. 62/069,266, filed on Oct. 27, 2014.

(51) Int. Cl.
*G06F 3/06* (2006.01)

(52) U.S. Cl.
CPC .......... *G06F 3/0604* (2013.01); *G06F 3/0616* (2013.01); *G06F 3/0625* (2013.01);
(Continued)

(58) Field of Classification Search
None
See application file for complete search history.

(56) References Cited

U.S. PATENT DOCUMENTS

| 5,493,196 A | 2/1996 | Feldstein |
| 5,714,869 A | 2/1998 | Tamechika et al. |

(Continued)

FOREIGN PATENT DOCUMENTS

| EP | 0 878 755 A1 | 11/1998 |
| EP | 2 602 707 A2 | 6/2013 |
| WO | WO 2010/116349 | 10/2010 |

OTHER PUBLICATIONS

Gurumurthi, Sudhanva, Anand Sivasubramaniam, and Vivek K. Natarajan.Disk drive roadmap from the thermal perspective: A case for dynamic thermal management. vol. 33. No. 2. IEEE Computer Society, 2005.*

(Continued)

*Primary Examiner* — Charles Rones
*Assistant Examiner* — Hewy H Li
(74) *Attorney, Agent, or Firm* — Brinks Gilson & Lione (57) ABSTRACT

Systems, methods, and/or devices are used to manage a storage system. In one aspect, the method includes, during a first time period: maintaining a credit pool for the first time period; limiting bandwidth used for transmitting data between a storage device of the storage system and a host operatively coupled with the storage device according to a status of the credit pool, where the storage device includes one or more memory devices; monitoring a temperature of the storage device; and, in accordance with a determination that a current temperature of the storage device exceeds a predetermined threshold temperature and the current temperature of the storage device satisfies one or more temperature criteria, reducing an initial value of the credit pool for a second time period according to a first adjustment factor corresponding to the predetermined temperature threshold, where the second time period is subsequent to the first time period.

25 Claims, 6 Drawing Sheets

(52) U.S. Cl.
CPC .......... *G06F 3/0631* (2013.01); *G06F 3/0653* (2013.01); *G06F 3/0659* (2013.01); *G06F 3/0679* (2013.01); *G06F 3/0688* (2013.01); *Y02B 60/1246* (2013.01)

(56) References Cited

U.S. PATENT DOCUMENTS

| | | | |
|---|---|---|---|
| 6,035,347 | A | 3/2000 | Beardsley et al. |
| 6,172,573 | B1 | 1/2001 | Lim |
| 8,725,931 | B1 | 5/2014 | Kang |
| 8,751,836 | B1 | 6/2014 | Piszczek et al. |
| 8,788,779 | B1 | 7/2014 | Horn |
| 8,938,630 | B2 | 1/2015 | Jeddeloh |
| 2001/0011319 | A1 | 8/2001 | Beppu |
| 2004/0021444 | A1 | 2/2004 | Peschke |
| 2004/0130299 | A1 | 7/2004 | Pietkiewicz et al. |
| 2004/0267409 | A1 | 12/2004 | De Lorenzo et al. |
| 2005/0108491 | A1 | 5/2005 | Wong et al. |
| 2005/0204175 | A1* | 9/2005 | Burton .............. G06F 1/206 713/300 |
| 2005/0210304 | A1 | 9/2005 | Hartung et al. |
| 2008/0005410 | A1* | 1/2008 | Mies .............. G06F 3/0614 710/62 |
| 2008/0005511 | A1 | 1/2008 | Laudon |
| 2008/0098242 | A1 | 4/2008 | Peterson |
| 2009/0171513 | A1* | 7/2009 | Tsukazawa ........ G06F 1/203 700/300 |
| 2010/0049905 | A1 | 2/2010 | Ouchi |
| 2011/0122691 | A1 | 5/2011 | Sprouse |
| 2011/0191666 | A1 | 8/2011 | Decker et al. |
| 2011/0239009 | A1 | 9/2011 | Noda |
| 2011/0314312 | A1 | 12/2011 | Naffziger et al. |
| 2012/0023346 | A1 | 1/2012 | Byom et al. |
| 2012/0159057 | A1 | 6/2012 | Loh et al. |
| 2012/0290864 | A1 | 11/2012 | Seroff |
| 2012/0331207 | A1 | 12/2012 | Lassa et al. |
| 2012/0331282 | A1 | 12/2012 | Yurzola et al. |
| 2013/0080679 | A1 | 3/2013 | Bert |
| 2013/0275781 | A1 | 10/2013 | Ramage et al. |
| 2013/0305008 | A1 | 11/2013 | Kwon et al. |
| 2014/0304560 | A1 | 10/2014 | Narasimha et al. |
| 2015/0033045 | A1 | 1/2015 | Raghuvanshi et al. |
| 2015/0169021 | A1 | 6/2015 | Salessi et al. |
| 2015/0323976 | A1 | 11/2015 | Chen et al. |
| 2016/0062421 | A1* | 3/2016 | Sugawara .............. G06F 1/206 700/299 |
| 2016/0085458 | A1* | 3/2016 | Skandakumaran ... G06F 3/0613 710/313 |
| 2016/0116968 | A1 | 4/2016 | Thangaraj et al. |

OTHER PUBLICATIONS

Nguyen, Hung T., et al. "Trade-off between sample size and accuracy: Case of measurements under interval uncertainty." International Journal of Approximate Reasoning 50.8 (2009): 1164-1176.*

Internation Search Report and Written Opinion dated Jul. 14, 2015, received in International Patent Application No. PCT/US2015/027265, which corresponds to U.S. Appl. No. 14/572,619, 10 pages (Ellis).

International Search Report and Written Opinion dated Dec. 15, 2015, received in International Patent Application No. PCT/US2015/053641, which corresponds to U.S. Appl. No. 14/668,710, 12 pages (Thangaraj).

International Search Report and Written Opinion dated Dec. 14, 2015, received in International Patent Application No. PCT/US2015/053644, which corresponds to U.S. Appl. No. 14/668,722, 12 pages (Thangaraj).

International Search Report and Written Opinion dated Feb. 11, 2016, received in International Patent Application No. PCT/US2015/053549 which corresponds to U.S. Appl. No. 14/572,633, 13 pages (Ellis).

Notice of Allowance in U.S. Appl. No. 14/668,722, dated Nov. 27, 2017, 5 pages.

Notice of Allowance in U.S. Appl. No. 14/668,722, dated Nov. 15, 2017, 13 pages.

Office Action in U.S. Appl. No. 14/668,722, dated Dec. 16, 2016, 24 pages.

* cited by examiner

METHOD AND SYSTEM FOR THROTTLING BANDWIDTH BASED ON TEMPERATURE

RELATED APPLICATIONS

This application claims priority to U.S. Provisional Application No. 62/069,266, filed Oct. 27, 2014, which is hereby incorporated by reference in its entirety.

TECHNICAL FIELD

The disclosed embodiments relate generally to memory systems, and in particular, to limiting the bandwidth of a storage device (e.g., comprising one or more flash memory devices).

BACKGROUND

Semiconductor storage systems are commonly used for storing and managing data for electronic devices. A typical non-volatile data storage system stores data as an electrical value in the memory cells of the storage system and memory controllers are generally tasked with managing data transactions across multiple memory devices of the storage system.

Data transactions in data storage systems are generally carried out by executions of memory operations or commands. To facilitate this process, memory controllers are often constructed with command queues that help optimize command executions across multiple memory cells. Multiple commands executed in parallel across the data storage system, however, can result in spikes in power consumption and temperature.

SUMMARY

Various embodiments of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various embodiments are used to manage a storage system with a storage device including one or more memory devices. In one aspect, a storage controller of the storage device is configured to perform operations with/on the one or more memory devices (e.g., flash memory device(s)). In some embodiments, the storage controller throttles the input/output (I/O) bandwidth of the storage device according to the temperature of the storage device.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Figure 1:
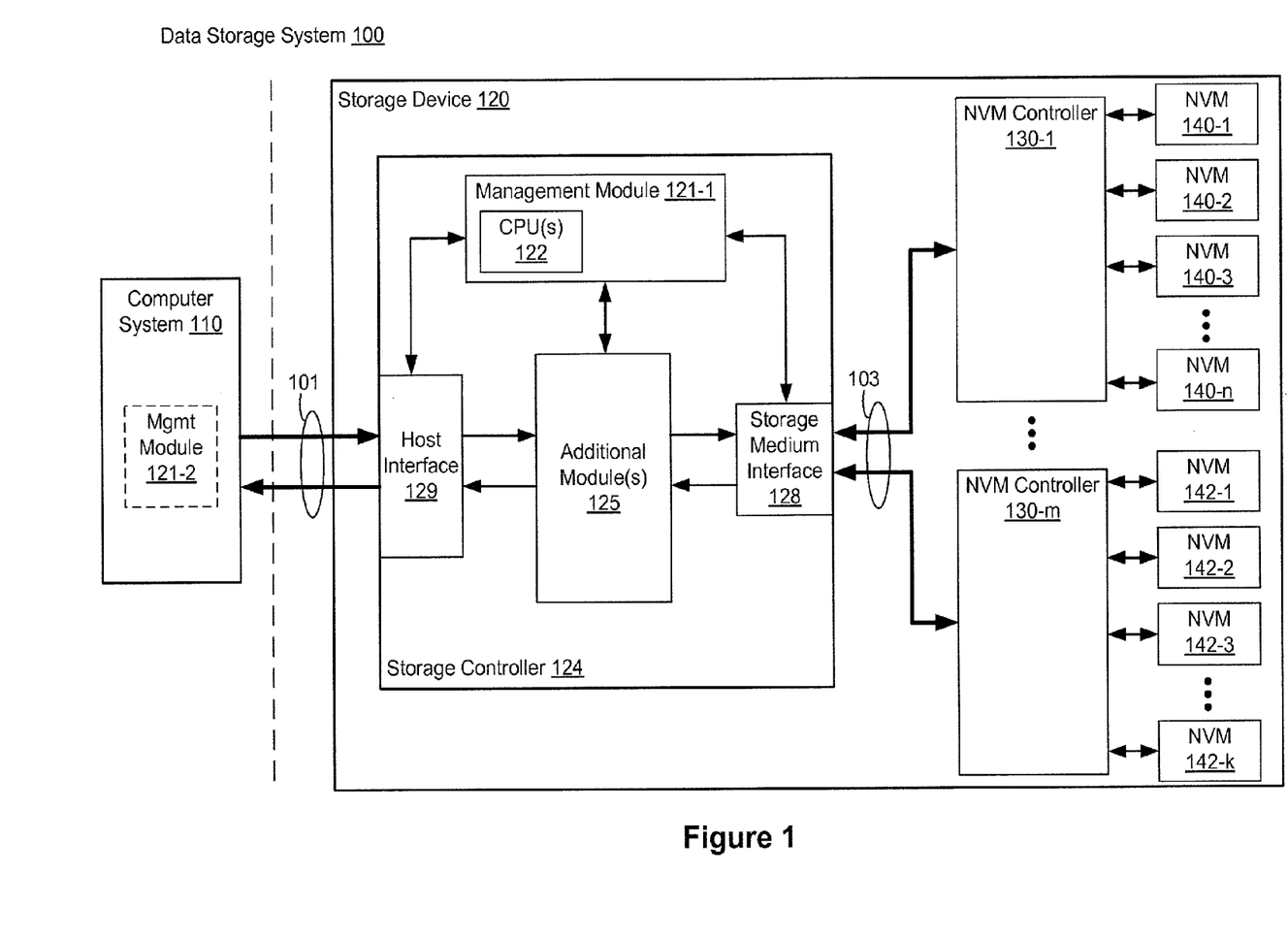
FIG. 1 is a block diagram illustrating an implementation of a data storage system, in accordance with some embodiments.

The various implementations described herein include systems, methods and/or devices that may limit the I/O bandwidth of a storage device with one or more memory devices (e.g., storage device 120 with non-volatile memory (NVM) devices 140, 142, FIG. 1) based on the temperature of the storage device.

(A1) More specifically, some embodiments include a method of managing a storage system. In some embodiments, during a first time period, the method includes: maintaining a credit pool (sometimes called a bandwidth credit pool) for the first time period; limiting bandwidth used for transmitting data between a storage device of the storage system and a host operatively coupled with the storage device in accordance with a status of the credit pool, where the storage device includes one or more memory devices; monitoring a temperature of the storage device; and, in accordance with a determination that a current temperature of the storage device exceeds a first predetermined threshold temperature and the current temperature of the storage device satisfies one or more temperature criteria, reducing an initial value of the credit pool for a second time period according to a first adjustment factor corresponding to the first predetermined temperature threshold, where the second time period is subsequent to the first time period.

(A2) In some embodiments of the method of A1, during the first time period, in accordance with a determination that a current temperature of the storage device is below the first predetermined threshold temperature and the current temperature of the storage device satisfies one or more temperature criteria, the method includes increasing an initial value of the credit pool for the second time period according to the first adjustment factor corresponding to the first predetermined temperature threshold, where the second time period is subsequent to the first time period.

(A3) In some embodiments of the method of any of A1 to A2, during the second time period, the method includes: maintaining the credit pool for the second time period; limiting bandwidth used for transmitting data between the storage device and the host in accordance with the status of the credit pool; monitoring a temperature of the storage device; and, in accordance with a determination that a current temperature of the storage device exceeds a second predetermined threshold temperature and the current temperature of the storage device satisfies one or more temperature criteria, reducing an initial value of the credit pool for a third time period according to a second adjustment factor corresponding to the second temperature threshold, where the third time period is subsequent to the second time period, and where the second adjustment factor is distinct from the first adjustment factor.

(A4) In some embodiments of the method of any of A1 to A3, during the first time period, the method includes: receiving a request to perform a respective memory operation (sometimes called a first memory operation) on the one or more memory devices; and, in accordance with a determination that at least one credit (sometimes called a bandwidth credit) remains in the credit pool for the first time period: performing the respective memory operation; and decrementing the credit pool according to the respective memory operation.

(A5) In some embodiments of the method of A4, the method further includes, in accordance with a determination that there are no credits (sometimes called bandwidth credits) remaining in the credit pool for the first time period: forgoing performance of the respective memory operation; and adding the respective memory operation to a deferred memory operations queue.

(A6) In some embodiments of the method of any of A1 to A5, the method further includes, in accordance with a determination that the first time period has elapsed, replenishing the credit pool according to the reduced initial value for the second time period.

(A7) In some embodiments of the method of any of A1 to A6, the first time period and the second time period correspond to a predetermined length of time.

(A8) In some embodiments of the method of any of A1 to A7, an initial value for the credit pool corresponds to a predetermined number of memory operations.

(A9) In some embodiments of the method of any of A7 to A8, the method further includes, in accordance with a determination that a current temperature of the storage device exceeds a predetermined reporting temperature and the current temperature of the storage device satisfies one or more temperature criteria, sending a notification to a user according to a predefined communication method.

(A10) In some embodiments of the method of any of A1 to A9, the one or more memory devices comprise one or more flash memory devices.

(A11) In another aspect, a storage device includes non-volatile memory, and a storage controller having one or more processors configured to execute instructions in one or more programs, where the storage controller is configured to perform or control performance of any of the methods A1 to A10 described herein.

(A12) In some embodiments of the storage device of A11, the storage controller includes one or more credit modules to maintain the credit pool and update a value of the credit pool, a bandwidth limiting module to limit the bandwidth used for transmitting data between the storage device of the storage system and the host operatively coupled with the storage device in accordance with the status of the credit pool, and a temperature monitoring module to monitor the temperature of the storage device.

(A13) In yet another aspect, any of the methods A1 to A10 described above are performed by a storage device including means for performing or controlling performance of any of the methods described herein.

(A14) In yet another aspect, a storage system includes (1) a storage medium (e.g., comprising one or more non-volatile storage devices, such as flash memory devices), (2) one or more processors, and (3) memory (e.g., non-volatile memory or volatile memory in the storage system) storing one or more programs, which when executed by the one or more processors cause the storage system to perform or control performance of any of the methods A1 to A10 described herein.

(A15) In yet another aspect, some embodiments include a non-transitory computer readable storage medium, storing one or more programs configured for execution by one or more processors of a storage device, the one or more programs including instructions for performing or controlling performance of any of the methods A1 to A10 described herein.

FIG. 1 is a block diagram illustrating data storage system 100, in accordance with some embodiments. While some example features are illustrated, various other features have not been illustrated for the sake of brevity and so as not to obscure pertinent aspects of the example embodiments disclosed herein. To that end, as a non-limiting example, data storage system 100 includes storage device 120 (also sometimes called an information storage device, or a data storage device, or a memory device), which includes storage controller 124, one or more non-volatile memory (NVM) controllers 130 such as flash controllers, and non-volatile memory (e.g., one or more NVM device(s) 140, 142 such as one or more flash memory devices), and is used in conjunction with computer system 110. In some embodiments, storage device 120 includes a single NVM device while in other embodiments storage device 120 includes a plurality of NVM devices. In some embodiments, NVM devices 140, 142 include NAND-type flash memory or NOR-type flash memory. Further, in some embodiments, NVM controllers 130 are solid-state drive (SSD) controllers. However, other types of storage media may be included in accordance with aspects of a wide variety of embodiments (e.g., PCRAM, ReRAM, STT-RAM, etc.). In some embodiments, a flash memory device includes one or more flash memory die, one or more flash memory packages, one or more flash memory channels or the like. In some embodiments, data storage system 100 can contain one or more storage device 120s.

Computer system 110 is coupled to storage controller 124 through data connections 101. However, in some embodiments computer system 110 includes storage controller 124, or a portion of storage controller 124, as a component and/or a subsystem. For example, in some embodiments, some or all of the functionality of storage controller 124 is implemented by software executed on computer system 110. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host, host system, client, or client system. In some embodiments, computer system 110 is a server system, such as a server system in a data center. In some embodiments, computer system 110 includes one or more processors, one or more types of memory, a display and/or other user interface components such as a keyboard, a touch screen display, a mouse, a track-pad, a digital camera, and/or any number of supplemental devices to add functionality. In some embodiments, computer system 110 does not have a display and other user interface components.

The one or more NVM controllers 130 are coupled with storage controller 124 through connections 103. Connections 103 are sometimes called data connections, but typically convey commands in addition to data, and optionally convey metadata, error correction information and/or other information in addition to data values to be stored in NVM devices 140, 142 and data values read from NVM devices 140, 142. In some embodiments, however, storage controller 124, the one or more NVM controllers 130, and NVM devices 140, 142 are included in the same device (i.e., an integrated device) as components thereof. Furthermore, in some embodiments, storage controller 124, the one or more NVM controllers 130, and NVM devices 140, 142 are embedded in a host device (e.g., computer system 110), such as a mobile device, tablet, other computer or computer controlled device, and the methods described herein are performed, at least in part, by the embedded storage controller.

In some embodiments, storage device 120 includes NVM devices 140, 142 such as flash memory devices (e.g., NVM devices 140-1 through 140-*n*, and NVM devices 142-1 through 142-*k*) and NVM controllers 130 (e.g., NVM controllers 130-1 through 130-*m*). Viewed another way, storage device 120 includes m memory channels, each of which has an NVM controller 130 and a set of NVM devices 140 or 142 coupled to the NVM controller 130, where m is an integer greater than one. However, in some embodiments, two or more memory channels share an NVM controller 130. In either example, each memory channel has its own distinct set of NVM devices 140 or 142. In a non-limiting example, the number of memory channels in a typical storage device is 8, 16, or 32. In another non-limiting example, the number of NVM devices 140 or 142 per memory channel is typically 8, 16, 32, or 64. Furthermore, in some embodiments, the number of NVM devices 140/142 is different in different memory channels.

In some embodiments, each NVM controller of NVM controllers 130 include one or more processing units (also sometimes called CPUs or processors or microprocessors or microcontrollers) configured to execute instructions in one or more programs (e.g., in NVM controllers 130). In some embodiments, the one or more processors are shared by one or more components within, and in some cases, beyond the function of NVM controllers 130. NVM devices 140, 142 are coupled to NVM controllers 130 through connections that typically convey commands in addition to data, and optionally convey metadata, error correction information and/or other information in addition to data values to be stored in NVM devices 140, 142 and data values read from NVM devices 140, 142. NVM devices 140, 142 may include any number (i.e., one or more) of memory devices including, without limitation, non-volatile semiconductor memory devices, such as flash memory device(s).

For example, flash memory device(s) (e.g., NVM devices 140, 142) can be configured for enterprise storage suitable for applications such as cloud computing, for database applications, primary and/or secondary storage, or for caching data stored (or to be stored) in secondary storage, such as hard disk drives. Additionally and/or alternatively, flash memory device(s) (e.g., NVM devices 140, 142) can also be configured for relatively smaller-scale applications such as personal flash drives or hard-disk replacements for personal, laptop, and tablet computers. Although flash memory devices and flash controllers are used as an example here, in some embodiments storage device 120 includes other non-volatile memory device(s) and corresponding non-volatile storage controller(s).

In some embodiments, NVM devices 140, 142 are divided into a number of addressable and individually selectable blocks. In some embodiments, the individually selectable blocks are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device.

In some embodiments, storage controller 124 includes a management module 121-1, a host interface 129, a storage medium (I/O) interface 128, and additional module(s) 125. Storage controller 124 may include various additional features that have not been illustrated for the sake of brevity and so as not to obscure pertinent features of the example embodiments disclosed herein, and a different arrangement of features may be possible.

Host interface 129 provides an interface to computer system 110 through data connections 101. Similarly, storage medium interface 128 provides an interface to NVM controllers 130 though connections 103. In some embodiments, storage medium interface 128 includes read and write circuitry, including circuitry capable of providing reading signals to NVM controllers 130 (e.g., reading threshold voltages for NAND-type flash memory). In some embodiments, connections 101 and connections 103 are implemented as a communication media over which commands and data are communicated, using a protocol such as DDR3, SCSI, SATA, SAS, or the like. In some embodiments, storage controller 124 includes one or more processing units (also sometimes called CPUs or processors or microprocessors or microcontrollers) configured to execute instructions in one or more programs (e.g., in storage controller 124). In some embodiments, the one or more processors are shared by one or more components within, and in some cases, beyond the function of storage controller 124.

In some embodiments, management module 121-1 includes one or more processing units (CPUs, also sometimes called processors or microprocessors or microcontrollers) 122 configured to execute instructions in one or more programs (e.g., in management module 121-1). In some embodiments, the one or more CPUs 122 are shared by one or more components within, and in some cases, beyond the function of storage controller 124. Management module 121-1 is coupled to host interface 129, additional module(s) 125 and storage medium interface 128 in order to coordinate the operation of these components. In some embodiments, one or more modules of management module 121-1 are implemented in management module 121-2 of computer system 110. In some embodiments, one or more processors of computer system 110 (not shown) are configured to execute instructions in one or more programs (e.g., in management module 121-2). In some embodiments, management module 121-2 is coupled to storage device 120 in order to manage the operation of storage device 120.

Additional module(s) 125 are coupled to storage medium interface 128, host interface 129, and management module 121-1. As an example, additional module(s) 125 may include an error control module to limit the number of uncorrectable errors inadvertently introduced into data during writes to memory and/or reads from memory. In some embodiments, additional module(s) 125 are executed in software by the one or more CPUs 122 of management module 121-1, and, in other embodiments, additional module(s) 125 are implemented in whole or in part using special purpose circuitry (e.g., to perform encoding and decoding functions). In some embodiments, additional module(s) 125 are implemented in whole or in part by software executed on computer system 110.

In some embodiments, an error control module, included in additional module(s) 125, includes an encoder and a decoder. In some embodiments, the encoder encodes data by applying an error-correcting code (ECC) to produce a codeword, which is subsequently stored in NVM devices 140, 142. When encoded data (e.g., one or more codewords) is read from NVM devices 140, 142, the decoder applies a decoding process to the encoded data to recover the data, and to correct errors in the recovered data within the error correcting capability of the error-correcting code. Those skilled in the art will appreciate that various error-correcting codes have different error detection and correction capacities, and that particular codes are selected for various applications for reasons beyond the scope of this disclosure. As such, an exhaustive review of the various types of error-correcting codes is not provided herein. Moreover, those skilled in the art will appreciate that each type or family of error-correcting codes may have encoding and decoding algorithms that are particular to the type or family of error-correcting codes. On the other hand, some algorithms may be utilized at least to some extent in the decoding of a number of different types or families of error-correcting codes. As such, for the sake of brevity, an exhaustive description of the various types of encoding and decoding algorithms generally available and known to those skilled in the art is not provided herein.

In some embodiments, during a write operation, host interface 129 receives data to be stored in NVM devices 140, 142 from computer system 110. The data received by host interface 129 is made available to an encoder (e.g., in additional module(s) 125), which encodes the data to produce one or more codewords. The one or more codewords are made available to storage medium interface 128, which transfers the one or more codewords to NVM devices 140, 142 (e.g., through NVM controllers 130) in a manner dependent on the type of storage medium being utilized.

In some embodiments, a read operation is initiated when computer system (host) 110 sends one or more host read commands (e.g., via data connections 101, or alternatively a separate control line or bus) to storage controller 124 requesting data from NVM devices 140, 142. Storage controller 124 sends one or more read access commands to NVM devices 140, 142 (e.g., through NVM controllers 130), via storage medium interface 128, to obtain raw read data in accordance with memory locations (addresses) specified by the one or more host read commands. Storage medium interface 128 provides the raw read data (e.g., comprising one or more codewords) to a decoder (e.g., in additional module(s) 125). If the decoding is successful, the decoded data is provided to host interface 129, where the decoded data is made available to computer system 110. In some embodiments, if the decoding is not successful, storage controller 124 may resort to a number of remedial actions or provide an indication of an irresolvable error condition.

As explained above, a storage medium (e.g., NVM devices 140, 142) is divided into a number of addressable and individually selectable blocks and each block is optionally (but typically) further divided into a plurality of pages and/or word lines and/or sectors. While erasure of a storage medium is performed on a block basis, in many embodiments, reading and programming of the storage medium is performed on a smaller subunit of a block (e.g., on a page basis, word line basis, or sector basis). In some embodiments, the smaller subunit of a block consists of multiple memory cells (e.g., single-level cells or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types: (1) a lower page (sometimes called fast page), and (2) an upper page (sometimes called slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell. In some embodiments, the encoding format of the storage media (i.e., TLC, MLC, or SLC and/or a chosen data redundancy mechanism or ECC code) is a choice made when data is actually written to the storage media.

As an example, if data is written to a storage medium in pages, but the storage medium is erased in blocks, pages in the storage medium may contain invalid (e.g., stale) data, but those pages cannot be overwritten until the whole block containing those pages is erased. In order to write to the pages with invalid data, the pages (if any) with valid data in that block are read and re-written to a new block and the old block is erased (or put on a queue for erasing). This process is called garbage collection. After garbage collection, the new block contains the pages with valid data and may have free pages that are available for new data to be written, and the old block can be erased so as to be available for new data to be written. Since flash memory can only be programmed and erased a limited number of times, the efficiency of the algorithm used to pick the next block(s) to re-write and erase has a significant impact on the lifetime and reliability of flash-based storage systems.

Write amplification is a phenomenon where the actual amount of physical data written to a storage medium (e.g., NVM devices 140, 142 in storage device 120) is a multiple of the logical amount of data written by a host (e.g., computer system 110, sometimes called a host) to the storage medium. As discussed above, when a block of storage medium must be erased before it can be re-written, the garbage collection process to perform these operations results in re-writing data one or more times. This multiplying effect increases the number of writes required over the life of a storage medium, which shortens the time it can reliably operate. The formula to calculate the write amplification of a storage system is given by equation:

$$\frac{\text{amount of data written to a storage medium}}{\text{amount of data written by a host}}$$

One of the goals of any flash memory based data storage system architecture is to reduce write amplification as much as possible so that available endurance is used to meet storage medium reliability and warranty specifications. Higher system endurance also results in lower cost as the storage system may need less over-provisioning. By reducing write amplification, the endurance of the storage medium is increased and the overall cost of the storage system is decreased. Generally, garbage collection is performed on erase blocks with the fewest number of valid pages for best performance and best write amplification.

Flash memory devices utilize memory cells to store data as electrical values, such as electrical charges or voltages. Each flash memory cell typically includes a single transistor with a floating gate that is used to store a charge, which modifies the threshold voltage of the transistor (i.e., the voltage needed to turn the transistor on). The magnitude of the charge, and the corresponding threshold voltage the charge creates, is used to represent one or more data values. In some embodiments, during a read operation, a reading threshold voltage is applied to the control gate of the transistor and the resulting sensed current or voltage is mapped to a data value.

The terms "cell voltage" and "memory cell voltage," in the context of flash memory cells, means the threshold voltage of the memory cell, which is the minimum voltage that needs to be applied to the gate of the memory cell's transistor in order for the transistor to conduct current. Similarly, reading threshold voltages (sometimes also called reading signals and reading voltages) applied to a flash memory cells are gate voltages applied to the gates of the flash memory cells to determine whether the memory cells conduct current at that gate voltage. In some embodiments, when a flash memory cell's transistor conducts current at a given reading threshold voltage, indicating that the cell voltage is less than the reading threshold voltage, the raw data value for that read operation is a "1" and otherwise the raw data value is a "0."

Figure 2:
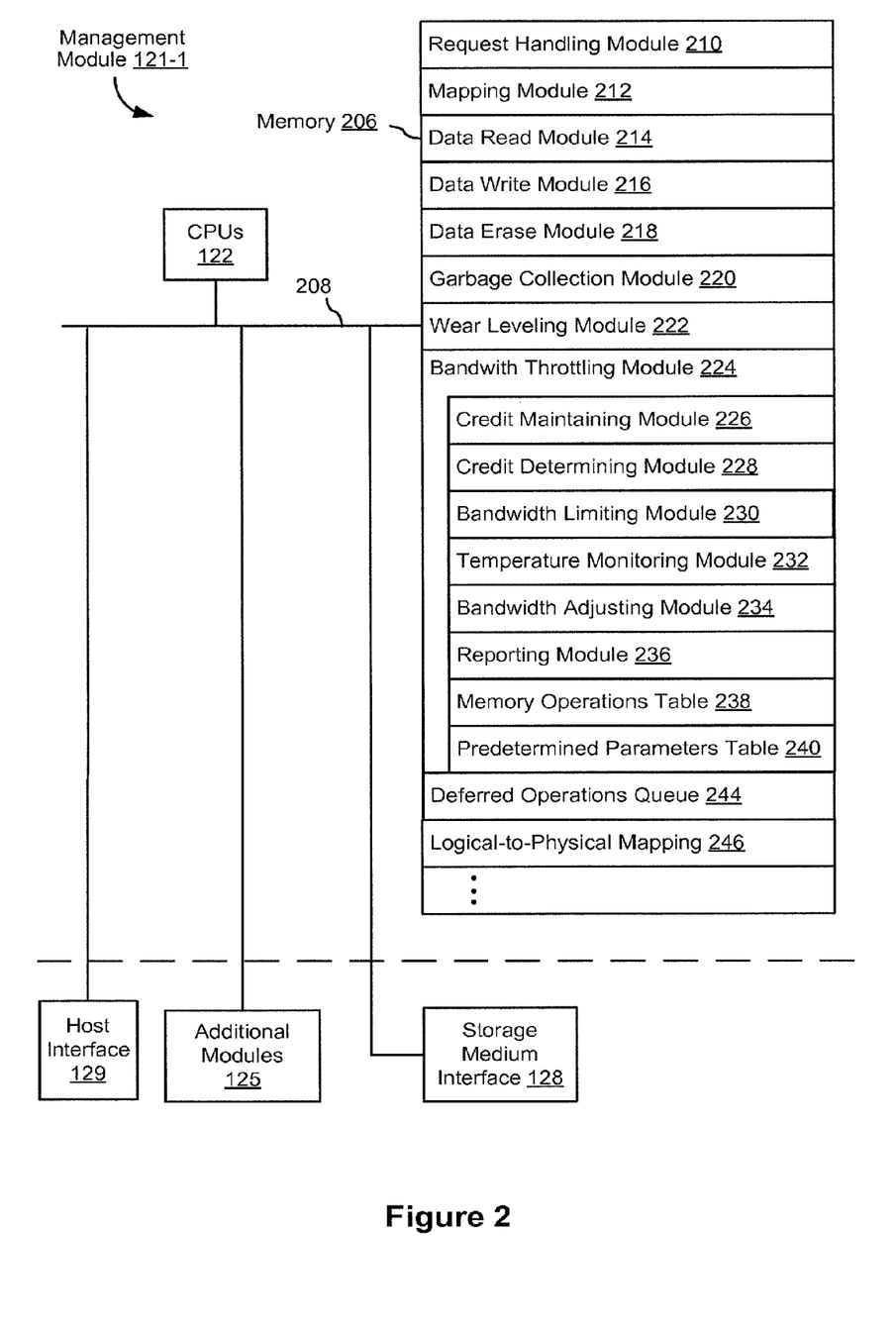
FIG. 2 is a block diagram of an implementation of a management module, in accordance with some embodiments.

FIG. 2 is a block diagram illustrating a management module 121-1, in accordance with some embodiments, as shown in FIG. 1. Management module 121-1 typically includes one or more processing units (sometimes called CPUs or processors) 122 for executing modules, programs, and/or instructions stored in memory 206 and thereby performing processing operations, memory 206 (sometimes called controller memory), and one or more communication buses 208 for interconnecting these components. The one or more communication buses 208 optionally include circuitry (sometimes called a chipset) that interconnects and controls communications between system components. Management module 121-1 is coupled to host interface 129, additional module(s) 125, and storage medium interface 128 by the one or more communication buses 208. Memory 206 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from CPU(s) 122. Memory 206, or alternatively the non-volatile memory device(s) within memory 206, comprises a non-transitory computer readable storage medium. In some embodiments, memory 206, or the non-transitory computer readable storage medium of memory 206 stores the following programs, modules, and data structures, or a subset or superset thereof:

- request handling module 210 for receiving input/output (I/O) requests from a host (e.g., write requests and/or read requests);
- mapping module 212 for mapping logical addresses to physical addresses using logical-to-physical mapping 246;
- data read module 214 data for reading data, or causing data to be read, from storage device 120 (e.g., NVM devices 140, 142);
- data write module 216 writing data, or causing data to be written, to storage device 120 (e.g., NVM devices 140, 142);
- data erase module 218 for erasing data, or causing data to be erased, from storage device 120 (e.g., NVM devices 140, 142);
- garbage collection module 220 for performing a garbage collection process on one or more memory portions (i.e., blocks) of storage device 120 (e.g., NVM devices 140, 142);
- wear leveling module 222 for optimally determining memory portions (i.e., pages or blocks) of storage device 120 (e.g., NVM devices 140, 142) for storing data so as to evenly wear the memory portions of storage device 120 (e.g., NVM devices 140, 142);
- bandwidth throttling module 224 for limiting the I/O bandwidth of storage device 120 based on the temperature of storage device 120, including but not limited to:
  - credit maintaining module 226 for maintaining and replenishing a credit pool (sometimes called the bandwidth credit pool) for a sequence of predetermined time periods (e.g., 1 second per period) to limit the I/O bandwidth of storage device 120 during each predetermined time period;
  - (optional) credit determining module 228 for determining a count of credits (sometimes called bandwidth credits) for a respective memory operation (e.g., a read, write, or erase operation) based on the respective memory operation and memory operations table 238;
  - bandwidth limiting module 230 for determining whether the balance of the bandwidth credit pool for a respective time period is greater than or equal to the count of bandwidth credits for the respective memory operation, and for deferring performance of the respective operation in accordance with a determination that the balance of the bandwidth credit pool for the respective time period is not greater than or equal to the count of bandwidth credits for the respective memory operation;
  - temperature monitoring module 232 for monitoring the temperature of storage device 120, and detecting a temperature increase event when the current temperature exceeds a respective predetermined temperature threshold and satisfies one or more temperature criteria and a temperature decrease event when the current temperature falls below a respective predetermined temperature threshold and satisfies one or more temperature criteria;
  - bandwidth adjusting module 234 for adjusting the initial value of the bandwidth credit pool for a subsequent time period according to an adjustment factor corresponding to the respective predetermined temperature threshold when temperature monitoring module 232 detects a temperature increase or decrease event;
  - reporting module 236 for sending a notification to a user according to a predefined communication method indicating a temperature reporting event (e.g., the notification indicates the current temperature and/or the temperature threshold that has been crossed);
- (optional) memory operations table 238 storing predefined bandwidth credit counts for various memory operations; and
- predetermined parameters table 240 storing a plurality of predetermined parameters for determining an initial value of the bandwidth credit pool, the predetermined length of time corresponding to the time periods, the adjustment factors, a predetermined number of memory operations corresponding to an initial bandwidth limit, the temperature thresholds, and the predetermined reporting temperature;

deferred operation queue 244 storing deferred memory operations, where the deferred operation queue 244 includes the respective memory operation in accordance with a determination by bandwidth limiting module 230 that the balance of the bandwidth credit pool or is less than the count of bandwidth credits for the respective memory operation; and logical-to-physical mapping 246 storing a logical-to-physical map which maps logical addresses recognized by the host (e.g., computer system 110, FIG. 1) to physical addresses of storage device 120 (e.g., NVM devices 140, 142).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the non-transitory computer readable storage medium of memory 206, provide instructions for implementing some of the methods described below. In some embodiments, some or all of these modules may be implemented with specialized hardware circuits that subsume part or all of the module functionality.

Although FIG. 2 shows a management module 121-1, FIG. 2 is intended more as functional description of the various features which may be present in a management module than as a structural schematic of the embodiments described herein. In practice, and as recognized by those of ordinary skill in the art, items shown separately could be combined and some items could be separated. In some embodiments, one or more of the operations and/or modules of management module 121-1 may instead be performed and/or implemented by management module 121-2. In some embodiments, one or more of the operations and/or modules of management module 121-1 may instead be performed and/or implemented by NVM controllers 130. For example, each NVM controller includes bandwidth throttling logic (e.g., similar to bandwidth throttling module 224, FIG. 2) for limiting the I/O bandwidth of corresponding NVM devices based on the temperature of those NVM devices. In some embodiments, bandwidth throttling module 224 may be implemented in whole or in part by software, hardware, firmware, or any combination thereof in data storage system 100 (FIG. 1).

Figure 3:
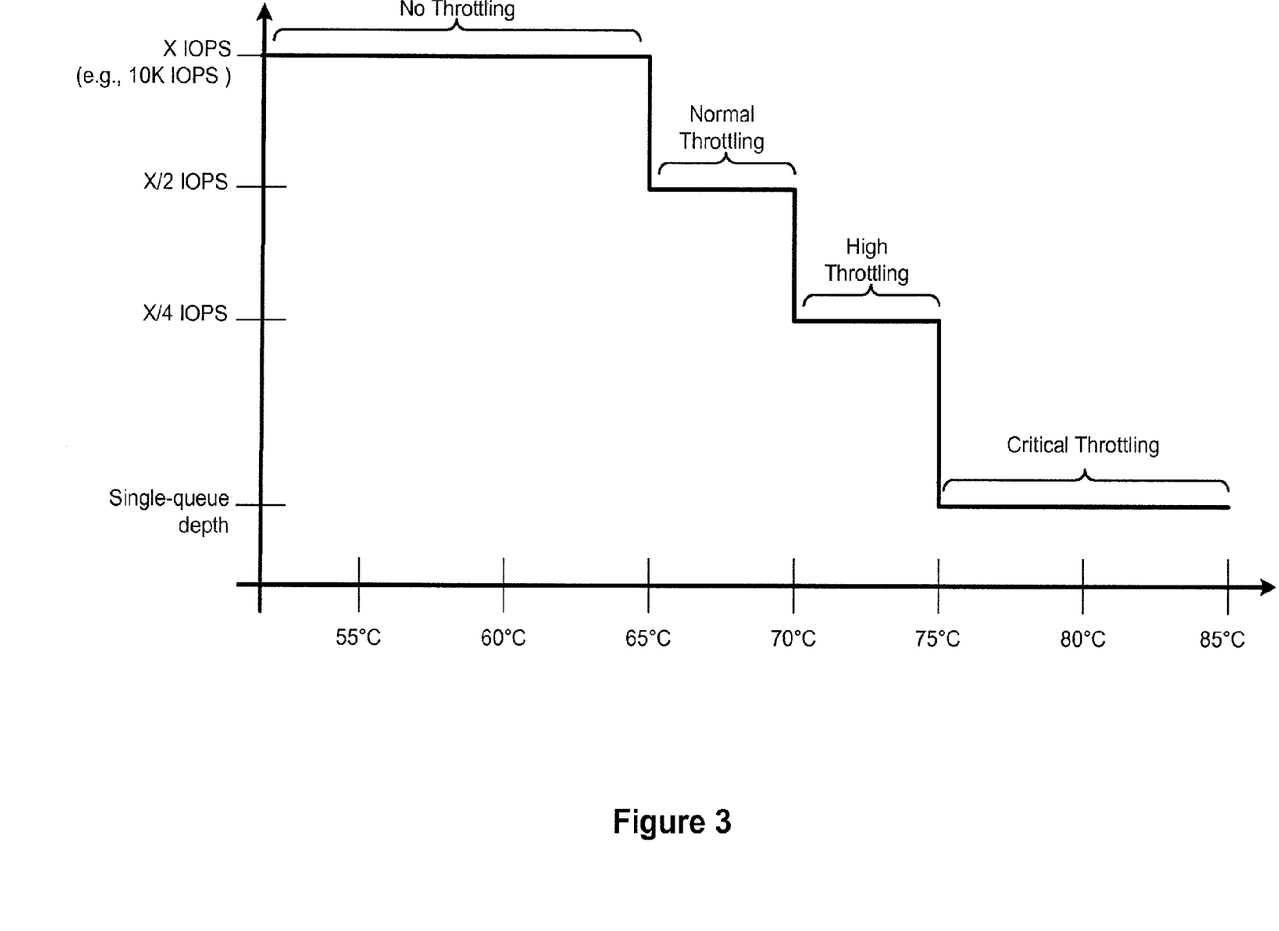
FIG. 3 is a prophetic diagram showing bandwidth being throttled based on temperature, in accordance with some embodiments.

FIG. 3 is a prophetic diagram showing bandwidth being throttled based on temperature, in accordance with some embodiments. In some embodiments, storage controller 124 or a component thereof (e.g., temperature monitoring module 232, FIG. 2) monitors the temperature of storage device 120. For temperatures lower than 65° C. (i.e., the "No Throttling" region), bandwidth throttling module 224 does not impose any throttling on the I/O bandwidth. Instead, in the "No Throttling" region, the initial I/O bandwidth limit is a predetermined number of memory operations such as 10,000 IOPS (input/output operations per second). In some embodiments, the predetermined number of memory operations is a tunable parameter that is stored in predetermined parameters table 240 (FIG. 2).

For temperatures between 65° C. and 70° C. (i.e., the "Normal Throttling" region), bandwidth throttling module 224 reduces the I/O bandwidth limit to 50% of that in the "No Throttling" region (e.g., a 5,000 IOPS bandwidth limit). For temperatures between 70° C. and 75° C. (i.e., the "High Throttling" region), bandwidth throttling module 224 reduces the I/O bandwidth limit to 25% of that in the "No Throttling" region (e.g., a 2,500 IOPS bandwidth limit). For temperatures greater than 75° C. (i.e., the "Critical Throttling" region), bandwidth throttling module 224 sets storage device 120 in single-queue depth mode whereby the I/O bandwidth is limited to a predefined number of MB/s (e.g., 16 MB/s) and only one outstanding memory operation is permitted to be processed at a time (e.g., no parallel processing of memory operations is permitted). Additionally and/or alternatively, in some embodiments, bandwidth throttling module 224 sets storage device 120 in single-queue depth mode if (A) the temperature exceeds a predefined threshold upon start-up, or (B) storage device 120 has remained idle for 60 seconds or more and the temperature has crossed a temperature threshold. One of skill in the art will appreciate that the temperature thresholds for the various regions may be changed and that the adjustment/reduction factors for each region may be changed.

Figure 4A:
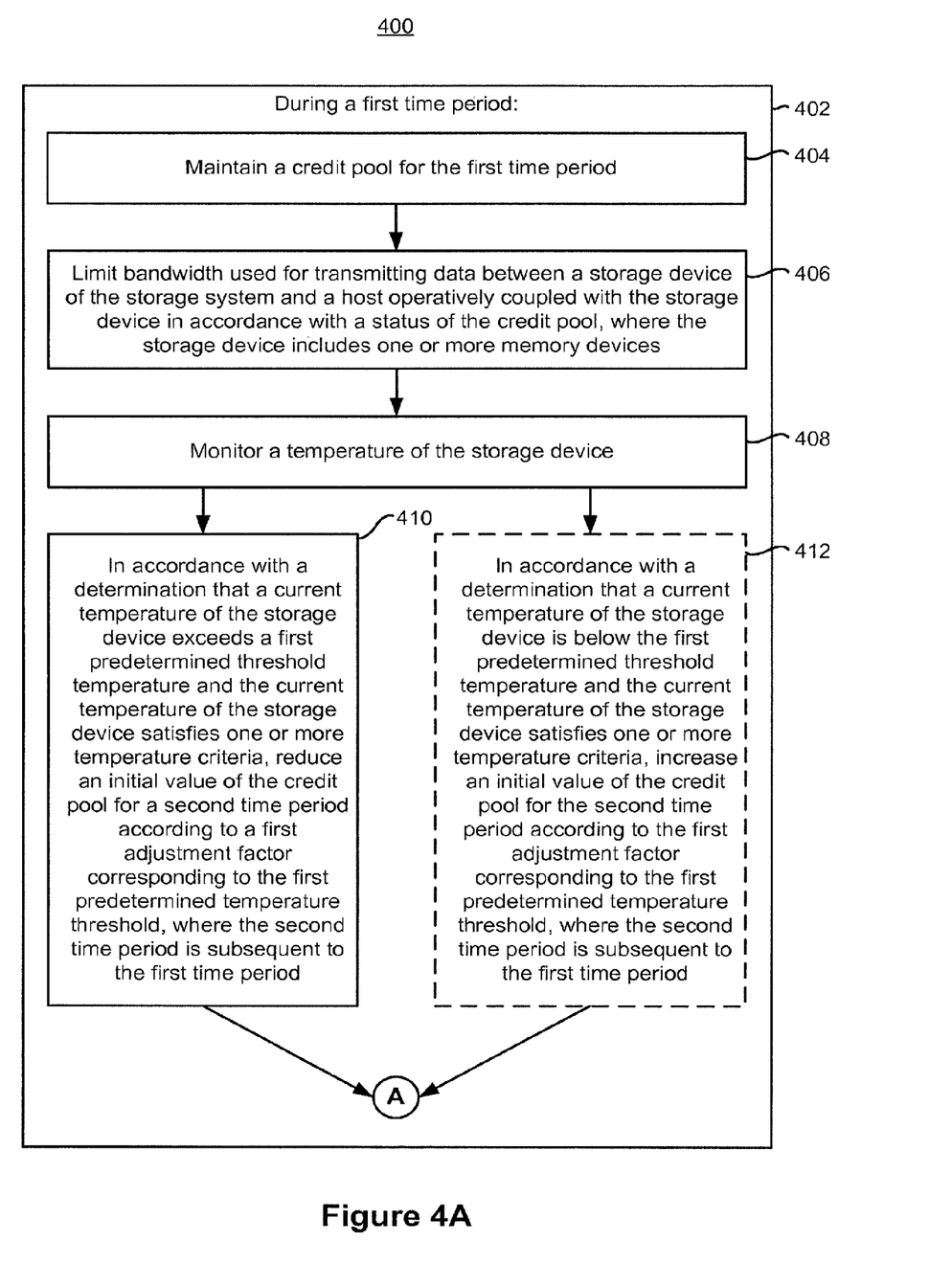
FIGS. 4A-4C illustrate a flowchart diagram of a method of managing a storage system, in accordance with some embodiments.
Figure 4B:
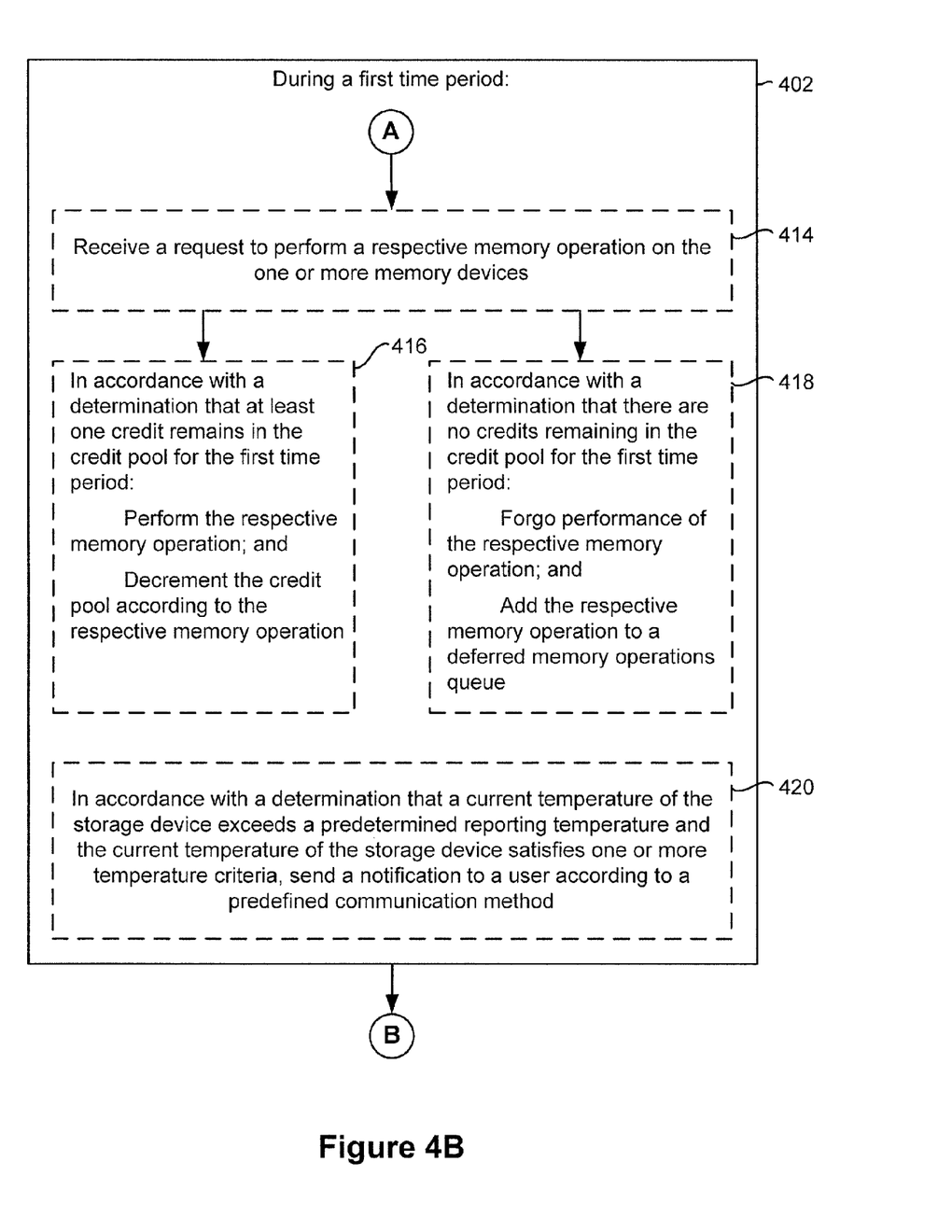
Figure 4C:
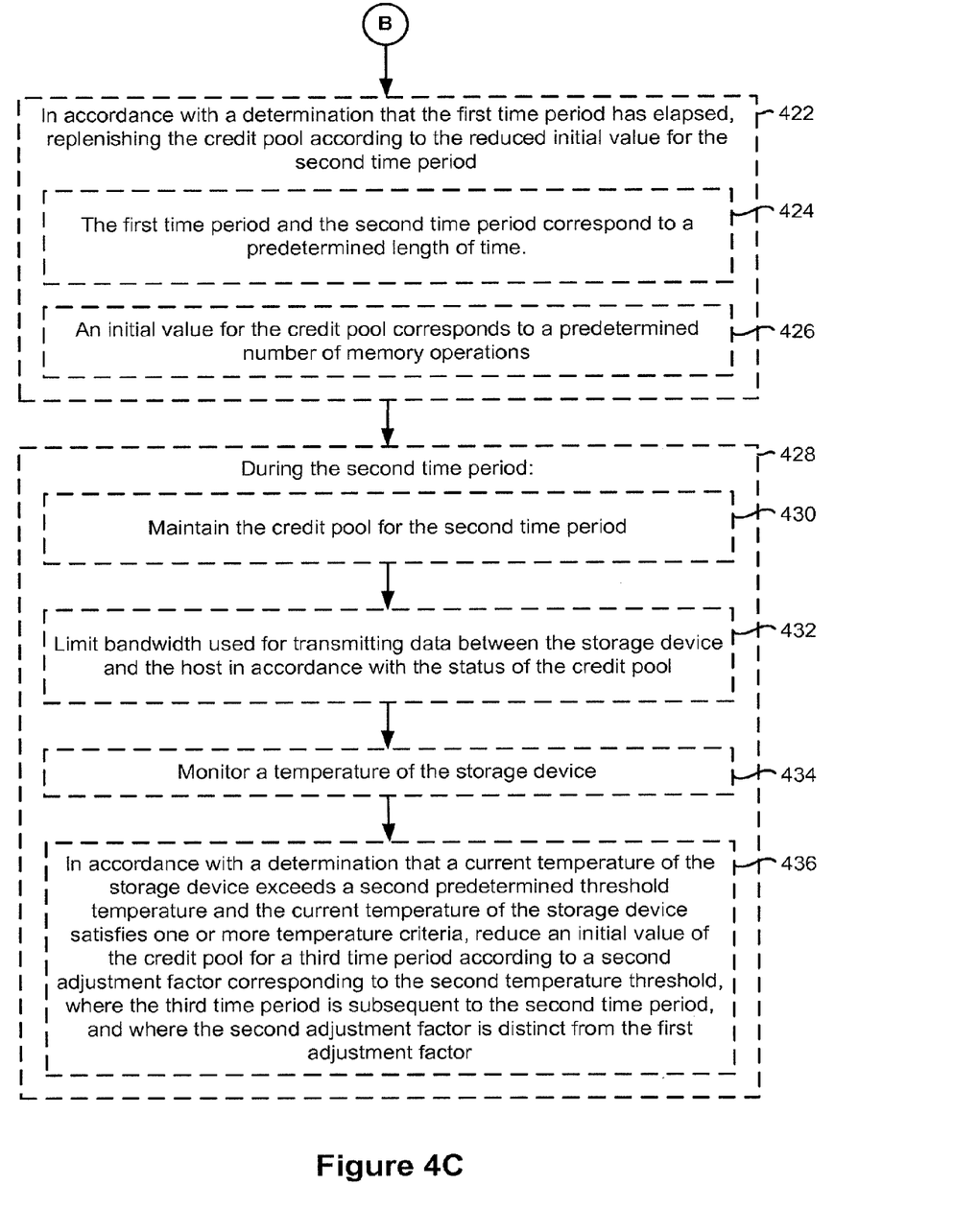

FIGS. 4A-4C illustrate a flowchart diagram of a method of managing a storage system, in accordance with some embodiments. In some embodiments, method 400 is performed by at least in part by a storage device (e.g., storage device 120, FIG. 1) of the storage system (e.g., data storage system 100, FIG. 1) with one or more processors and memory, where the storage device is operatively coupled with a host (e.g., computer system 110, FIG. 1) and the storage device includes one or more memory devices (e.g., NVM devices 140, 142, such as flash memory devices). For example, in some embodiments, method 400 is performed by storage controller 124 (FIG. 1) or a component thereof (e.g., management module 121-1, FIGS. 1-2). In another example, in some embodiments, method 400 is performed by computer system 110 (FIG. 1) or a component thereof (e.g., management module 121-2, FIG. 1). In yet another example, in some embodiments, method 400 is performed by a respective NVM controller 130 (FIG. 1) or a component thereof (e.g., bandwidth throttling logic). In some embodiments, method 400 is governed by instructions that are stored in a non-transitory computer readable storage medium (e.g., memory 206, FIG. 2) and the instructions are executed by one or more processors of the storage device (e.g., CPUs 122, FIGS. 1-2). Optional operations are indicated by dashed lines (e.g., boxes with dashed-line borders).

During a first time period (402), the storage device maintains (404) a credit pool (sometimes called a bandwidth credit pool) for the first time period. In some embodiments, storage controller 124 or a component thereof (e.g., credit maintaining module 226, FIG. 2) maintains a bandwidth credit pool for each of a plurality of predetermined time periods. For example, the first time period corresponds to the predetermined time period set as 1 second.

During a first time period (402), the storage device limits (406) bandwidth used for transmitting data between a storage device of the storage system and a host operatively coupled with the storage device in accordance with a status of the bandwidth credit pool, where the storage device includes one or more memory devices. In some embodiments, the storage device (e.g., storage device 120, FIG. 1) comprises a storage controller (e.g., storage controller 124, FIG. 1) and the one or more memory devices (e.g., NVM devices 140, 142, FIG. 1). For example, each memory device comprises a plurality of memory portions such as die, blocks, pages, etc. In some embodiments, the storage device is embedded in the host.

In some embodiments, storage controller 124 or a component thereof (e.g., bandwidth limiting module 230, FIG. 2) limits the processing of I/O operations by storage device 120 for the first time period based on the balance of the bandwidth credit pool. For example, the bandwidth credit pool imposes a bandwidth limit on the processing of input/output (I/O) operations (e.g., read and write memory operations) requested by the host, such as 10,000 IOPS (I/O operations per second). As such, in this example, the first time period is 1 second and the initial balance of the bandwidth credit pool is 10,0000. For example, with respect to FIG. 3, the initial I/O bandwidth limit for storage device 120 is X IOPS (e.g., 10,000 IOPS) at temperatures lower than 65° C.

During a first time period (402), the storage device monitors (408) a temperature of the storage device. In some embodiments, storage controller 124 or a component thereof (e.g., temperature monitoring module 232, FIG. 2) monitors the temperature of storage device 120. In some embodiments, the storage device includes a plurality of temperature sensors (e.g., located at NVM devices 140, 142 and the case of storage device 120). In some embodiments, the detected temperature is a peak temperature from a single sensor or the average of the plurality of temperature sensors.

During a first time period (402), in accordance with a determination that a current temperature of the storage device exceeds a first predetermined threshold temperature and the current temperature of the storage device satisfies one or more temperature criteria, the storage device reduces (410) an initial value of the bandwidth credit pool for a second time period according to a first adjustment factor corresponding to the first predetermined temperature threshold, where the second time period is subsequent to the first time period. In some embodiments, the I/O bandwidth limit (e.g., in IOPS) of storage device 120 is adjusted based on the observed temperature for storage device 120.

In some embodiments, storage controller 124 or a component thereof (e.g., temperature monitoring module 232, FIG. 2) detects a temperature increase event when the current temperature of the storage device exceeds a first predetermined threshold temperature and the current temperature of the storage device satisfies one or more temperature event criteria. In some embodiments, the one or more temperature event criteria include a hysteresis factor, such as a peak temperature maintained for a minimum length of time, to filter out false temperature events. In some embodiments, storage controller 124 or a component thereof (e.g., bandwidth adjusting module 234, FIG. 2) reduces an initial value of the bandwidth credit pool for the subsequent time period according to a first adjustment factor corresponding to the first predetermined temperature threshold after temperature monitoring module 232 detects the temperature increase event.

For example, with respect to FIG. 3, the initial I/O bandwidth limit for storage device 120 is X IOPS (e.g., a predetermined number such as 10,000 IOPS) at temperatures lower than 65° C. (e.g., the first predetermined temperature threshold). Continuing with this example, when temperature monitoring module 232 detects that the temperature has increased above 65° C. for a predefined minimum amount of time, bandwidth adjusting module 234 reduces the I/O bandwidth limit for the next time period according to the adjustment factor (X/2) corresponding to the 65° C. threshold (e.g., from 10,000 IOPS to 5,000 IOPS).

In some embodiments, during a first time period (402), in accordance with a determination that a current temperature of the storage device is below the first predetermined threshold temperature and the current temperature of the storage device satisfies one or more temperature criteria, the storage device increases (412) an initial value of the bandwidth credit pool for the second time period according to the first adjustment factor corresponding to the first predetermined temperature threshold, where the second time period is subsequent to the first time period. In some embodiments, storage controller 124 or a component thereof (e.g., temperature monitoring module 232, FIG. 2) detects a temperature decrease event when the current temperature of the storage device falls below a first predetermined threshold temperature and the current temperature of the storage device satisfies one or more temperature criteria. In some embodiments, storage controller 124 or a component thereof (e.g., bandwidth adjusting module 234, FIG. 2) increase an initial value of the bandwidth credit pool for the subsequent time period according to a first adjustment factor corresponding to the first predetermined temperature threshold after temperature monitoring module 232 detects the temperature decrease event.

For example, with respect to FIG. 3, the I/O bandwidth limit for storage device 120 is X/2 IOPS (e.g., 5,000 IOPS) at temperatures between 65° C. (e.g., the first predetermined temperature threshold) and 70° C. (e.g., the second predetermined temperature threshold). Continuing with this example, when temperature monitoring module 232 detects that the temperature has decreased below 65° C. for a predefined minimum amount of time, bandwidth adjusting module 234 increases the I/O bandwidth limit for the next time period according to the adjustment factor (2×) corresponding to the 65° C. threshold (e.g., from 5,000 IOPS to 10,000 IOPS).

In some embodiments, during the first time period (402), the storage device receives (414) a request to perform a respective memory operation on the one or more memory devices. In some embodiments, storage controller 124 or a component thereof (e.g., request handling module 210, FIG. 2) receives a request from the host operatively coupled with the storage device (e.g., a process internal to storage device 120 or computer system 110 (FIG. 1) external to storage device 120) to perform a memory operation (e.g., a read, write, or erase operation) on NVM devices 140, 142. In some embodiments, the various I/O operation types are weighted evenly (e.g., 1 credit each). In some other embodiments, different I/O operation types are weighted differently (e.g., write operations are weighted more heavily than read operations, because write operations on average consume more power than read operations).

In some embodiments, a weight (in unit credits) is assigned to respective memory operation types based on an estimated completion time for the memory operation type (e.g., an estimate based on the average completion time for memory operations of the respective type). For example, in accordance with some embodiments, the fastest memory operation type (e.g., the baseline memory operation) is assigned a weight of one and all other memory operation types are assigned integer multiples of the weight based on their respective completion times relative to the completion time of the fastest memory operation type. In some embodiments, the assigned weights are based on an estimate of the power consumed during execution of a memory operation of the corresponding operation type. In some embodiments, the assigned weights are based on an average power consumed during execution of a memory operation of the corresponding operation type.

In some embodiments, in accordance with a determination that at least one bandwidth credit remains in the bandwidth credit pool for the first time period, the storage device (416): performs the respective memory operation; and decrements the bandwidth credit pool according to the respective memory operation. In some embodiments, storage controller 124 of a component thereof (e.g., bandwidth limiting module 230, FIG. 2) determines whether the balance of the bandwidth credit pool includes sufficient bandwidth credits to perform the respective memory operation. In some embodiments, the cost in unit credits for the respective memory operation is 1 (as with all operation types) or it may be weighted based on its estimated processing duration of the respective memory operation, as discussed above with respect to Table 1. In accordance with a determination that the balance of the bandwidth credit pool is greater than or equal to the count of bandwidth credits for the respective memory operation, storage controller 124 or a component thereof (e.g., data read module 214, FIG. 2; data write module 216, FIG. 2; or data erase module 218, FIG. 2) performs the respective memory operation, and storage controller 124 or a component thereof (e.g., credit maintaining module 226, FIG. 2) decrements the balance of the bandwidth credit pool according to the count of bandwidth credits for the respective memory operation.

In some embodiments, in accordance with a determination that there are no credits remaining in the bandwidth credit pool for the first time period, the storage device (418): forgoes performance of the respective memory operation; and adds the respective memory operation to a deferred memory operations queue. In some embodiments, storage controller 124 of a component thereof (e.g., bandwidth limiting module 230, FIG. 2) determines whether the balance of the bandwidth credit pool includes sufficient credits to perform the respective memory operation. In accordance with a determination that the balance of the bandwidth credit pool is less than the count of bandwidth credits for the respective memory operation, storage controller 124 or a component thereof forgoes performance of the respective memory operation and adds the respective memory operation to deferred operation queue 244. In some embodiments, memory operations in deferred operation queue 244 are performed on a first-in-first-out basis when the bandwidth credit pool has a sufficient balance during a subsequent time period.

In some embodiments, in accordance with a determination that a current temperature of the storage device exceeds a predetermined reporting temperature and the current temperature of the storage device satisfies one or more temperature criteria, the storage device sends (420) a notification to a user according to a predefined communication method. In some embodiments, temperature monitoring module 232 detects a temperature reporting event when the current temperature has crossed (e.g., exceeded or fallen below) a predetermined reporting temperature and satisfies one or more temperature criteria In some embodiments, storage controller 124 or a component thereof (e.g., reporting module 236, FIG. 2) sends a notification to a user according to a predefined communication method when the temperature reporting event is detected. For example, the user is the operator, administrator, or owner of storage device 120 or data storage system 100. For example, the predefined communication method is an email sent to a predefined email address corresponding to the user or an SMS or voice message sent to a predefined phone number corresponding to the user. In some embodiments, the notification includes an indication of the current temperature and whether the temperature of the storage device exceeded or fell below the reporting temperature.

In some embodiments, in accordance with a determination that the first time period has elapsed, the storage device replenishes (422) the bandwidth credit pool according to the reduced initial value for the second time period. In accordance with a determination that the first time period has elapsed, storage controller 124 or a component thereof (e.g., credit maintaining module 226, FIG. 2) replenishes the bandwidth credit pool according to the first maximum value for the bandwidth credit pool. For example, after detecting a temperature increase event and the first time period has elapsed, storage controller 124 or a component thereof (e.g., credit maintaining module 226, FIG. 2) replenishes the bandwidth credit pool according to the reduced initial value determined in operation 410. For example, after detecting a temperature decrease event and the first time period has elapsed, storage controller 124 or a component thereof (e.g., credit maintaining module 226, FIG. 2) replenishes the bandwidth credit pool according to the increased initial value determined in operation 412.

In some embodiments, the first time period and the second time period correspond to (424) a predetermined length of time. In some embodiments, the predetermined parameters table 240 stores the predetermined length of time for the first time period and the second time period (e.g., 1 second). In some embodiments, the predetermined length of time is tunable according to the specification of a user of storage device 120 or data storage system 100.

In some embodiments, an initial value for the bandwidth credit pool corresponds to (426) a predetermined number of memory operations. In some embodiments, the predetermined parameters table 240 stores the predetermined number of memory operations. For example, in FIG. 3, the initial I/O bandwidth limit for temperatures lower than 65° C. is 10,000 IOPS (i.e., the "No Throttling" region).

During the second time period (428), the storage device: maintains (430) the bandwidth credit pool for the second time period; limits (432) bandwidth used for transmitting data between the storage device and the host in accordance with the status of the bandwidth credit pool; monitors (434) a temperature of the storage device; and, in accordance with a determination that a current temperature of the storage device exceeds a second predetermined threshold temperature and the current temperature of the storage device satisfies one or more temperature criteria, reduces (436) an initial value of the bandwidth credit pool for a third time period according to a second adjustment factor corresponding to the second temperature threshold, where the third time period is subsequent to the second time period, and where the second adjustment factor is distinct from the first adjustment factor. For example, with respect to FIG. 3, when temperature monitoring module 232 detects that the temperature has increased above 70° C. for a predefined minimum amount of time, bandwidth adjusting module 234 reduces the I/O bandwidth limit for the next time period according to the adjustment factor (X/4) corresponding to the 70° C. threshold (e.g., from 5,000 IOPS to 2,500 IOPS).

It should be understood that the particular order in which the operations in FIGS. 4A-4C have been described is merely exemplary and is not intended to indicate that the described order is the only order in which the operations could be performed. One of ordinary skill in the art would recognize various ways to reorder the operations described herein.

It will be understood that, although the terms "first," "second," etc. may be used herein to describe various elements, these elements should not be limited by these terms. These terms are only used to distinguish one element from another. For example, a first region could be termed a second region, and, similarly, a second region could be termed a first region, without changing the meaning of the description, so long as all occurrences of the "first region" are renamed consistently and all occurrences of the "second region" are renamed consistently. The first region and the second region are both regions, but they are not the same region.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the phrase "at least one of A, B, and C" is to be construed to require one or more of the listed items, and this phase reads on a single instance of A alone, a single instance of B alone, or a single instance of C alone, while also encompassing combinations of the listed items such "one or more of A and one or more of B without any of C," and the like.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of managing a storage system, the method comprising:
   maintaining a credit pool for a first time period in a sequence of time periods;
   limiting bandwidth used for transmitting data between a storage device of the storage system and a host in accordance with a status of the credit pool, wherein the storage device includes one or more memory devices;
   monitoring a temperature of the storage device; and
   in accordance with a determination that the temperature of the storage device during the first time period exceeds a first predetermined threshold temperature, reducing an initial value of the credit pool for a second time period, without reducing a value of the credit pool for the first time period, according to a first adjustment factor corresponding to the first predetermined temperature threshold, wherein the second time period is subsequent to the first time period in the sequence of time periods, and wherein the value of the credit pool for the first time period is not reduced due to the temperature of the storage device during the first time period exceeding the first predetermined threshold temperature;
   during the first time period,
      receiving a request to perform a first memory operation on the one or more memory devices; and
      in accordance with a determination that there are insufficient credits remaining in the credit pool for the first time period to perform the first memory operation:
         forgoing performance of the first memory operation; and
         adding the first memory operation to a deferred memory operations queue for performing the first memory operation in a subsequent time period.

2. The method of claim 1, further comprising:
   in accordance with a determination that the temperature of the storage device during the first time period is below the first predetermined threshold temperature, increasing an initial value of the credit pool for the second time period according to the first adjustment factor corresponding to the first predetermined temperature threshold.

3. The method of claim 1, further comprising:
   during the second time period:
      maintaining the credit pool for the second time period;
      limiting bandwidth used for transmitting data between the storage device and the host in accordance with the status of the credit pool;
      monitoring a temperature of the storage device; and
      in accordance with a determination that the temperature of the storage device exceeds a second predetermined threshold temperature, reducing an initial value of the credit pool for a third time period according to a second adjustment factor corresponding to the second temperature threshold, wherein the third time period is subsequent to the second time period in the sequence of time periods, and wherein the second adjustment factor is distinct from the first adjustment factor.

4. The method of claim 1, further comprising:
   in accordance with a determination that the credit pool has sufficient credits to perform the first memory operation during the first time period:
      performing the first memory operation; and
      decrementing the credit pool according to the first memory operation.

5. The method of claim 1, wherein the initial value of the credit pool for the second time period is reduced in accordance with the determination that the temperature of the storage device during the first time period exceeds the first predetermined threshold temperature and also in accordance with a determination that the temperature of the storage device during the first time period satisfies a temperature event criterion that filters out false temperature events.

6. The method of claim 1, further comprising:
in accordance with a determination that the first time period has elapsed, replenishing the credit pool according to the reduced initial value for the second time period.

7. The method of claim 1, wherein an initial value for the credit pool corresponds to a predetermined number of memory operations.

8. The method of claim 1, further comprising:
in accordance with a determination that the temperature of the storage device exceeds a predetermined reporting temperature, sending a notification to a user according to a predefined communication method.

9. A storage device, comprising:
non-volatile memory;
a storage controller having one or more processors configured to execute instructions in one or more programs;
wherein the storage controller is configured to perform operations comprising:
maintaining a credit pool for a first time period in a sequence of time periods;
limiting bandwidth used for transmitting data between a storage device of the storage system and a host in accordance with a status of the credit pool, wherein the storage device includes one or more memory devices;
monitoring a temperature of the storage device;
in accordance with a determination that the temperature of the storage device during the first time period exceeds a first predetermined threshold temperature, reducing an initial value of the credit pool for a second time period according to a first adjustment factor corresponding to the first predetermined temperature threshold, wherein the second time period is subsequent to the first time period in the sequence of time periods;
during the first time period, receiving a request to perform a first memory operation on the one or more memory devices; and
in accordance with a determination that there are insufficient credits remaining in the credit pool for the first time period to perform the first memory operation:
forgoing performance of the first memory operation; and
adding the first memory operation to a deferred memory operations queue for performing the first memory operation in a subsequent time period.

10. The storage device of claim 9, wherein the storage controller includes:
one or more credit modules to maintain the credit pool and update a value of the credit pool;
a bandwidth limiting module to limit the bandwidth used for transmitting data between the storage device of the storage system and the host operatively coupled with the storage device in accordance with the status of the credit pool; and
a temperature monitoring module to monitor the temperature of the storage device.

11. The storage device of claim 9, wherein the storage controller is further configured to perform operations comprising:
in accordance with a determination that the temperature of the storage device during the first time period is below the first predetermined threshold temperature, increasing an initial value of the credit pool for the second time period according to the first adjustment factor corresponding to the first predetermined temperature threshold.

12. The storage device of claim 9, the one or more programs further comprising instructions for:
during the second time period:
maintaining the credit pool for the second time period;
limiting bandwidth used for transmitting data between the storage device and the host in accordance with the status of the credit pool;
monitoring a temperature of the storage device; and
in accordance with a determination that the temperature of the storage device exceeds a second predetermined threshold temperature, reducing an initial value of the credit pool for a third time period according to a second adjustment factor corresponding to the second temperature threshold, wherein the third time period is subsequent to the second time period in the sequence of time periods, and wherein the second adjustment factor is distinct from the first adjustment factor.

13. The storage device of claim 9, the one or more programs further comprising instructions for:
in accordance with a determination that the credit pool has sufficient credits to perform the first memory operation during the first time period:
performing the first memory operation; and
decrementing the credit pool according to the first memory operation.

14. The storage device of claim 9, wherein the initial value of the credit pool for the second time period is reduced in accordance with the determination that the temperature of the storage device during the first time period exceeds the first predetermined threshold temperature and also in accordance with a determination that the temperature of the storage device during the first time period satisfies a temperature event criterion that filters out false temperature events.

15. The storage device of claim 9, the one or more programs further comprising instructions for:
in accordance with a determination that the first time period has elapsed, replenishing the credit pool according to the reduced initial value for the second time period.

16. The storage device of claim 9, wherein an initial value for the credit pool corresponds to a predetermined number of memory operations.

17. The storage device of claim 9, the one or more programs further comprising instructions for:
in accordance with a determination that the temperature of the storage device exceeds a predetermined reporting temperature, sending a notification to a user according to a predefined communication method.

18. A storage system comprising:
means for maintaining a credit pool for a first time period in a sequence of time periods;
means for limiting bandwidth used for transmitting data between a storage device of the storage system and a host in accordance with a status of the credit pool, wherein the storage device includes one or more memory devices;
means for monitoring a temperature of the storage device;
means for in accordance with a determination that the temperature of the storage device during the first time period exceeds a first predetermined threshold temperature, reducing an initial value of the credit pool for a second time period according to a first adjustment factor corresponding to the first predetermined temperature threshold, wherein the second time period is subsequent to the first time period in the sequence of time periods;

means for during the first time period, receiving a request to perform a first memory operation on the one or more memory devices; and means for in accordance with a determination that there are insufficient credits remaining in the credit pool for the first time period to perform the first memory operation:
  forgoing performance of the first memory operation; and
  adding the first memory operation to a deferred memory operations queue for performing the first memory operation in a subsequent time period.

19. The storage system of claim 18 further comprising:
means for in accordance with a determination that the temperature of the storage device during the first time period is below the first predetermined threshold temperature, increasing an initial value of the credit pool for the second time period according to the first adjustment factor corresponding to the first predetermined temperature threshold.

20. The storage system of claim 18 further comprising:
means for during the second time period:
  maintaining the credit pool for the second time period;
  limiting bandwidth used for transmitting data between the storage device and the host in accordance with the status of the credit pool;
  monitoring a temperature of the storage device; and
  in accordance with a determination that the temperature of the storage device exceeds a second predetermined threshold temperature, reducing an initial value of the credit pool for a third time period according to a second adjustment factor corresponding to the second temperature threshold, wherein the third time period is subsequent to the second time period in the sequence of time periods, and wherein the second adjustment factor is distinct from the first adjustment factor.

21. The storage system of claim 18 further comprising:
means for in accordance with a determination that the credit pool has sufficient credits to perform the first memory operation during the first time period:
  performing the first memory operation; and
  decrementing the credit pool according to the first memory operation.

22. The storage system of claim 18, wherein the initial value of the credit pool for the second time period is reduced in accordance with the determination that the temperature of the storage device during the first time period exceeds the first predetermined threshold temperature and also in accordance with a determination that the temperature of the storage device during the first time period satisfies a temperature event criterion that filters out false temperature events.

23. The storage system of claim 18 further comprising:
means for in accordance with a determination that the first time period has elapsed, replenishing the credit pool according to the reduced initial value for the second time period.

24. The storage system of claim 18, wherein an initial value for the credit pool corresponds to a predetermined number of memory operations.

25. The storage system of claim 18 further comprising:
means for in accordance with a determination that the temperature of the storage device exceeds a predetermined reporting temperature, sending a notification to a user according to a predefined communication method.

* * * * *